United States Patent [19]

Yamauchi et al.

[11] 4,332,633

[45] Jun. 1, 1982

[54] METHOD FOR PRODUCING SHOULDER PAD MATERIAL

[75] Inventors: Katsuyoshi Yamauchi; Kiyoto Nakai, both of Moriyama, Japan

[73] Assignee: Carl Freudenberg, Hohnerweg, Fed. Rep. of Germany

[21] Appl. No.: 209,803

[22] Filed: Nov. 24, 1980

[30] Foreign Application Priority Data

Nov. 26, 1979 [JP] Japan ................................ 54-153168

[51] Int. Cl.$^3$ ......................... B32B 27/02; B32B 31/18

[52] U.S. Cl. ....................................... 156/62.2; 2/267; 2/268; 156/254; 264/157; 264/160; 264/163

[58] Field of Search .............. 156/242, 245, 254, 62.2; 428/156, 158, 170, 171; 264/146, 157, 158, 160, 163; 2/267, 268

[56] References Cited

U.S. PATENT DOCUMENTS

| | | | |
|---|---|---|---|
| 2,646,573 | 7/1953 | Morgenstern | 2/268 |
| 3,197,357 | 7/1965 | Schulpen | 264/160 |

*Primary Examiner*—Caleb Weston
*Attorney, Agent, or Firm*—Sprung, Horn, Kramer & Woods

[57] ABSTRACT

A method of producing a shoulder pad blank having a thick-walled portion and a thin-walled portion comprising cutting a sheet of shoulder pad stock material sinusoidally into two intermediate blanks each having a plurality of ridges spaced a predetermined distance from each other, and then cutting the ridges sinusoidally along their length.

2 Claims, 11 Drawing Figures

Fig. 7
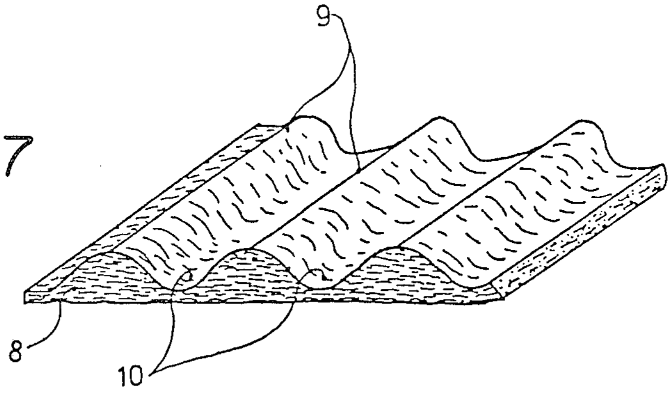
Fig. 8
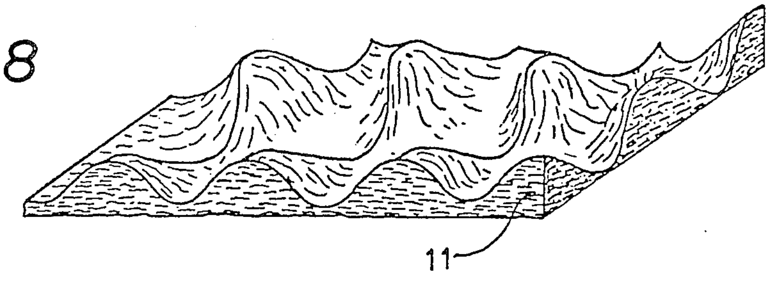
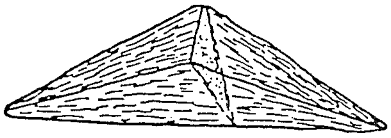
Fig. 9
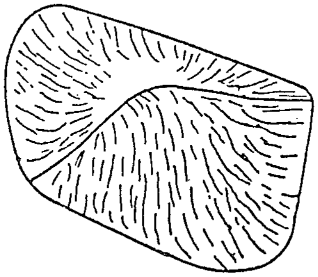
Fig. 10
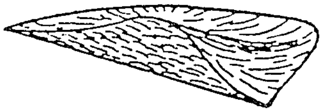
Fig. 11

METHOD FOR PRODUCING SHOULDER PAD MATERIAL

This invention relates to a method of producing a shoulder pad material in high yield, and more particularly to a method of producing a shoulder pad material having thick-walled portions and thin-walled portions.

Conventional shoulder pads have been manufactured by laminating large-, medium- and small-sized disc-shaped shoulder pad blanks, then integrating them by using a sewing machine or a needle punch to form a shoulder pad material and then cutting it into two pieces, or by hot-pressing laminated large-, medium- and small-sized shoulder pad blanks by interposing a thermoplastic resin therebetween to form an integral pad material and then cutting it into two pieces.

According to these methods, however, it was not possible to obtain shoulder pad blanks effectively in high yield from shoulder pad stock material of given area because the large-, medium- and small-sized disc-shaped shoulder pad blanks are punched out of a continuous length of shoulder pad stock material. Also, these known shoulder pad material production methods were inefficient and also attended by wide variation in quality because these methods depended on hand work for most of their steps.

There is also known a method in which a thermoplastic resin-impregnated felt or a bulky non-woven fabric composed of thermoplastic fibers is hot-pressed into a desired pattern of shoulder pad. However, the shoulder pad obtained according to this method has a hard hand as the peripheral thin-walled portion becomes more compact in texture than the thick-walled portion due to molding of the shoulder pad stock material with a press having a uniformly wide space between the press heads.

Japanese Patent Publication No. 4665/1979 proposes a continuous shoulder pad production method. According to this method, shoulder pad stock material is passed between a pair of shaped rolls engraved with concavities and convexities to produce a shoulder pad configuration and the remaining unnecessary part of the material is cut away by a sharp edge provided between the shaping rolls. Although this method is capable of highly efficient production of shoulder pads, it is also poor in yield because the part of the material cut away by the sharp edge as well as the flat parts of the pad stock material joining the concave and convex portions of the shaping rolls are scrapped.

The present invention overcomes these deficiencies. In accordance with the invention there is provided a method of producing shoulder pad material in extremely high yield, pursuant to which there is almost no waste of the shoulder pad stock material as it is cut in a specific configuration, and also four pieces of shoulder pad can be obtained from a shoulder pad stock material initially of such area as would otherwise have provided only one shoulder pad. Further, the shoulder pad obtained according to this method has a good feel because the thick-walled portion and the surrounding thin-walled portion have substantially the same degree of compactness.

Thus, this invention provides a method of producing a shoulder pad material having a thick-walled portion and a thin-walled portion therearound, wherein a sheet of shoulder pad stock material is cut sinusoidally into two pieces to form two sheets of shoulder pad intermediate blanks having a plurality of ridges spaced a predetermined distance from each other, and then the ridges of the shoulder pad intermediate blanks are cut sinusoidally along the length of said ridges, i.e. the second sine curves are transverse to the first.

The invention will now be described in further detail with reference to the accompanying drawings, wherein:

FIG. 7 is a perspective view of one sinusoidally cut intermediate blank;

FIG. 8 is a perspective view of the intermediate blank of FIG. 7 cut sinusoidally transversely to the first set of ridges;

FIGS. 9 and 10 are perspective views of doublets of shoulder pads, cut out of the final blank of FIG. 8; and FIG. 11 is one of the two final shoulder pads produced from the doublets of FIGS. 9 and 10.

Referring now more specifically to the drawings, as the first step, a substantially continuous sheet of shoulder pad stock material is cut sinusoidally into two pieces to form two sheets of shoulder pad blanks having a plurality of ridges spaced a given distance apart.

Figure 2:
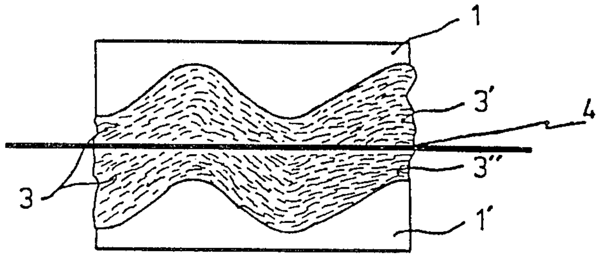
FIG. 2 is a schematic sectional view of the apparatus of FIG. 1 showing how to cut intermediate blanks from the sheet material.
Figure 3:
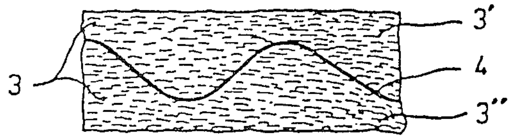
FIG. 3 is a schematic sectional view of a pair of intermediate blanks as produced from the apparatus of FIG. 2.

This first step can be accomplished by placing the shoulder pad stock material 3 (FIG. 2) between a pair of pressing plates 1, 1' each of which has one side sinusoidally undulated as shown, and then a sharp edge 2 is passed between the plates 1, 1' to cut and separate the shoulder pad stock material 3 into two portions 3' and 3''. Upon removal of the sheet 3 from the shoulder pad stock material 3 resumes its original state as shown in FIG. 3 and the rectilinear boundary line 4 shown in FIG. 2 becomes a sinusoidal line 4 as shown in FIG. 3. The wave-formed boundary line 4 may be sinusoidal as shown in FIG. 3 or may simply be serrated (not shown). All that is required is that a gently-sloping plane be provided at the area extending from the thick-walled portion to the thin-walled portion in the finally formed shoulder pad.

Any known type of shoulder pad stock material may be used as the starting material 3 in this invention, but it is particularly preferred to use a bulky non-woven fabric in which the constituent fibers are bound to each other with a binder having elasticity, because such non-woven fabrics have excellent deformability and elasticity. Hence it can easily be deformed to conform to the undulatory configuration of the pressing plates 1, 1' when the material is held therebetween, and can also quickly resume its original shape when the pressing plates 1, 1' are removed.

Figure 1:
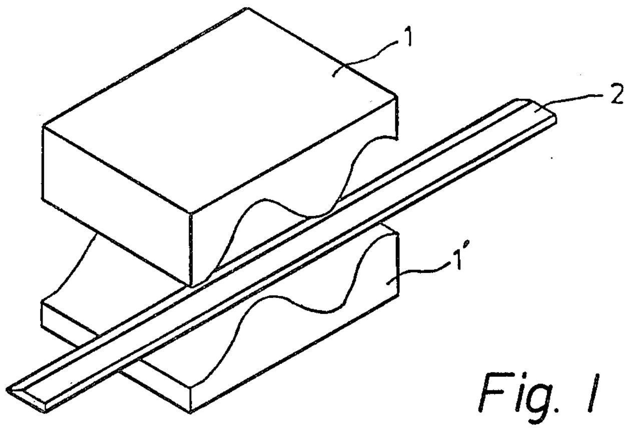
FIG. 1 is a schematic, exploded perspective view of an apparatus for producing shoulder pad intermediate blanks from a sheet material.
Figure 4:
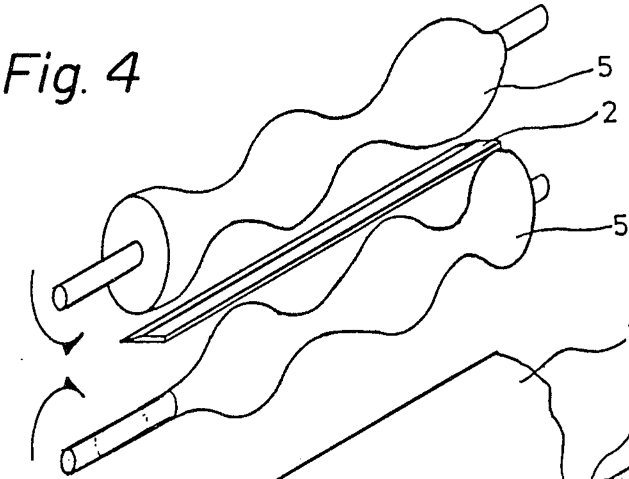
FIGS. 4, 5 and 6 are schematic perspective views of different apparatuses for making sinusoidal intermediate blanks.
Figure 6:
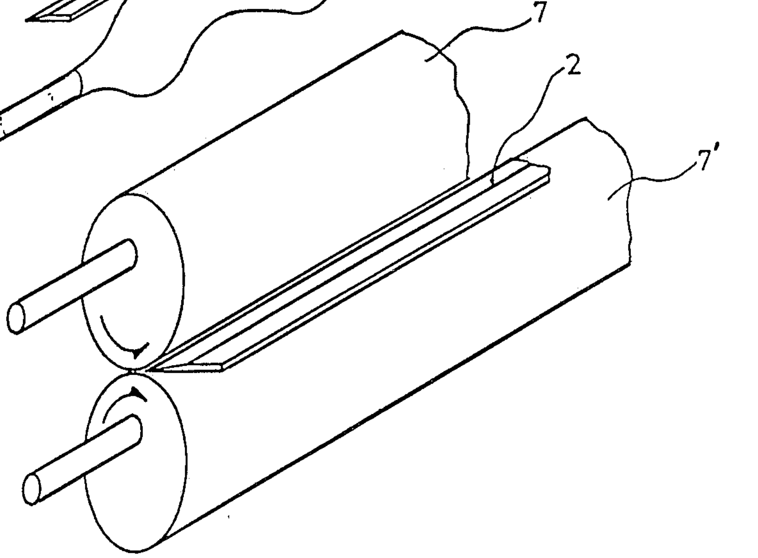
Figure 5:
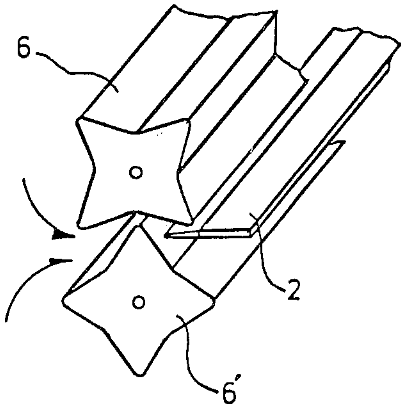

As another means for accomplishing the first step of this invention, a sharp edge 2 may be passed along a rectilinear section of the pressing plates 1, 1' instead of passing said edge along an undulatory section of the pressing plates 1, 1' as shown in FIG. 1. In still another embodiment shown in FIG. 4, a shoulder pad stock material 3 is held between a pair of pressing rolls 5, 5' having a plurality of constrictions and said material 3 is passed between the rolls 5, 5', and then the material is cut and separated into two pieces by a sharp edge 2 provided at the exit nip between the pressing rolls 5, 5'. It is also possible to use asteroidal pressing rolls 6, 6' as shown in FIG. 5, both rolls being so arranged that the protuberant portions of one roll coincide with the corresponding recesses of the other roll, or a pair of eccentric rotating rolls 7, 7' such as shown in FIG. 6. In these cases, the shoulder pad stock material 3 is advanced while in sinusoidal configuration and then is cut into two pieces by a sharp edge.

In this way, the shoulder pad stock material 3 is separated into two pieces to form two sheets of shoulder pad intermediate blanks 8 having a plurality of ridges 9 as shown in FIG. 7. While only one of the shoulder pad blanks 8 is shown in FIG. 7, it will be understood that the other blank has its ridges 9 and troughs 10 arranged just opposite to those of the illustrated blank 8. The height and width of the ridges 9 is such as will ultimately provide a pair of shoulder pads.

In the second step, each of such intermediate blanks 8 has its ridges cut sinusoidally along the length of the ridges thereby to form shoulder pad doublets. This step can be accomplished in the same way as the first step. For example, the shoulder pad blank 8 obtained in the manner shown in FIG. 1 is turned 90° and then held between the pressing plates 1, 1' so that the ridges will be cut sinusoidally along the length of the ridges, and then a sharp edge 2 is passed between the pressing plates 1, 1' thereby to obtain a shoulder pad blank 11 having a plurality of mountain-shaped thick-walled portions as shown in FIG. 8. An efficient way of carrying this out is to turn two intermediate blanks obtained in the manner shown in FIG. 1 90° while keeping them attached to each other with their respective ridges and troughs agreeing with each other, as for example shown in FIG. 3, and then cutting them as indicated. This allows simultaneous sinusoidal cutting of the ridges of two sheets of shoulder pad blanks along the length of the ridges. In this case, if the apparatus shown in FIG. 4 is used as the means for undulatory cutting in the first step, and the method shown in FIG. 5 or FIG. 6 is used for the second step, the ridges are formed in the direction of advance of the sheet-shaped shoulder pad stock material in the first step and such ridges are cut sinusoidally along the length of the ridges in the second step, thus allowing production of the shoulder pad stock. This is a very efficient production method as it permits continuous mass production.

From the shoulder pad stock material which has been subjected to the first and second steps as described above, there can be obtained two sheets of shoulder pad material having a plurality of mountain-shaped thick-walled portions as shown in FIG. 8 as well as a plurality of substantially oval-shaped doublet shoulder pads (FIG. 9), each being thick-walled at the central portion and thin-walled at the periphery, which were obtained by separating the ridges of the shoulder pad blank 11 of FIG. 8. The shoulder pad material shown in FIG. 8 is divided into many pieces each of which has one mountain-shaped thick-walled portion positioned centrally (FIG. 10), and such doublets are further bisected along the middle part of the mountain as shown in FIG. 10 to obtain a pair of shoulder pads such as shown in FIG. 11. The substantially oval-shaped shoulder pad shown in FIG. 9 is also bisected centrally thereof to obtain a pair of shoulder pads such as shown in FIG. 11. Thus, according to the method of this invention, four pairs of shoulder pads can be obtained from an area of initial stock material normally used for one pair of shoulder pads, and hence the method is very efficient. Further, both the thicked-walled portion and thin-walled portion of the resulting shoulder pad have substantially the same degree of compaction. Also, the thick-walled portion is voluminous while still soft.

The method of this invention can be accomplished by merely subjecting a sheet of shoulder pad stock material to two successive cutting and separating steps, so that it is possible to obtain the desired shoulder pad material without deforming the original sheet-like configuration of the stock material. Therefore, this invention has the additional advantage that a sheet-shaped shoulder pad material can be transported to a sewing factory in the form of a roll, i.e. in very compact form.

It will be appreciated that the instant specification and examples are set forth by way of illustration and not limitation, and that various modifications and changes may be made without departing from the spirit and scope of the present invention.

What is claimed is:

1. A method of producing a shoulder pad blank having a thick-walled portion and a thin-walled portion comprising cutting a sheet of shoulder pad stock material sinusoidally into two intermediate blanks each having a plurality of ridges spaced a predetermined distance from each other, cutting the ridges sinusoidally along their length, subdividing the blank into individual blanks comprising a thick mountainous center surrounded by a thin section, and cutting the individual blanks in half through the mountainous center.

2. A method according to claim 1, wherein the sheet comprises a bulky non-woven fabric wherein the fibers are bonded to one another with an elastic binder.

* * * * *